(12) United States Patent
Yurjevich et al.

(10) Patent No.: US 10,864,782 B2
(45) Date of Patent: Dec. 15, 2020

(54) DEVICES FOR REDUCING TIRE NOISE

(71) Applicant: Bridgestone Americas Tire Operations, LLC, Nashville, TN (US)

(72) Inventors: Martin A. Yurjevich, North Canton, OH (US); Amy M. Randall, Brentwood, TN (US)

(73) Assignee: Bridgestone Americas Tire Operations, LLC, Nashville, TN (US)

( * ) Notice: Subject to any disclaimer, the term of this patent is extended or adjusted under 35 U.S.C. 154(b) by 533 days.

(21) Appl. No.: 15/693,636

(22) Filed: Sep. 1, 2017

(65) Prior Publication Data

US 2018/0065426 A1 Mar. 8, 2018

Related U.S. Application Data

(60) Provisional application No. 62/384,498, filed on Sep. 7, 2016.

(51) Int. Cl.
*B60C 19/00* (2006.01)

(52) U.S. Cl.
CPC ................... *B60C 19/002* (2013.01)

(58) Field of Classification Search
CPC ................... B60C 19/002; B60C 19/003
See application file for complete search history.

(56) References Cited

U.S. PATENT DOCUMENTS

| 4,392,522 A | 7/1983 | Bschorr |
|---|---|---|
| 4,399,851 A | 8/1983 | Bschorr |
| 6,726,289 B2 | 4/2004 | Yukawa et al. |
| 7,188,652 B2 | 3/2007 | Yukawa |
| 7,347,239 B2 | 3/2008 | Yukawa et al. |
| 7,360,570 B2 | 4/2008 | Ishida |
| 7,500,499 B2 | 3/2009 | Tanno |
| 7,549,452 B2 | 6/2009 | Tanno et al. |
| 7,581,577 B2 | 9/2009 | Tanno |
| 7,677,286 B2 | 3/2010 | Tanno |
| 7,735,532 B2 | 6/2010 | Tanno et al. |
| 7,841,370 B2 | 11/2010 | Engel et al. |
| 7,854,244 B2 | 12/2010 | Tanno |
| 7,886,789 B2 | 2/2011 | Yukawa et al. |
| 8,028,796 B2 | 10/2011 | Ishihara |
| 8,136,560 B2 | 3/2012 | Tanno |
| 8,220,515 B2 | 7/2012 | Aoki et al. |
| 8,365,782 B2 | 2/2013 | Tanno et al. |
| 8,387,670 B2 | 3/2013 | Tanno et al. |
| 8,430,143 B2 | 4/2013 | Tanno |
| 8,448,743 B2 | 5/2013 | Tanno et al. |
| 8,544,510 B2 | 10/2013 | Yukawa |

(Continued)

FOREIGN PATENT DOCUMENTS

| DE | 102012021574 | 5/2014 |
|---|---|---|
| WO | 2013068763 | 5/2013 |
| WO | 2016001259 | 1/2016 |

*Primary Examiner* — Jacob T Minskey
*Assistant Examiner* — Adrien J Bernard
(74) *Attorney, Agent, or Firm* — Shaun J. Fox; Bryan J. Jaketic (57) ABSTRACT

A noise damper, noise attenuation device, and tire and noise damper assembly are disclosed. The noise damper, noise attenuation device, and tire and noise damper assembly mitigate sound produced by a moving tire. The noise damper and noise attenuation device fit within a tire cavity and expand in reaction to a stimulus.

13 Claims, 10 Drawing Sheets

(56) References Cited

U.S. PATENT DOCUMENTS

| | | |
|---|---|---|
| 8,746,302 B2 | 6/2014 | Sachdev et al. |
| 8,839,905 B2 | 9/2014 | Layfield |
| 8,997,806 B2 | 4/2015 | Tanno |
| 9,211,685 B2 | 12/2015 | Tanno |
| 2002/0144760 A1 | 10/2002 | Devizzi et al. |
| 2007/0089824 A1* | 4/2007 | Yukawa ................ B60C 19/002 152/450 |
| 2009/0308519 A1 | 12/2009 | Ishihara |
| 2009/0314402 A1 | 12/2009 | Kuramori et al. |
| 2010/0038005 A1* | 2/2010 | Aoki ..................... B60C 19/002 152/450 |
| 2010/0071820 A1 | 3/2010 | Noggle et al. |
| 2011/0308677 A1 | 12/2011 | Kamprath et al. |
| 2011/0308706 A1* | 12/2011 | Sandstrom ......... B29D 30/0061 156/123 |
| 2012/0325383 A1 | 12/2012 | Moore et al. |
| 2013/0048181 A1 | 2/2013 | Benoit |
| 2013/0098521 A1 | 4/2013 | Fowler-Hawkins et al. |
| 2014/0014248 A1 | 1/2014 | Parfondry et al. |
| 2014/0020801 A1 | 1/2014 | Tanno |
| 2014/0020806 A1 | 1/2014 | Greverie et al. |
| 2015/0048669 A1 | 2/2015 | Zhu et al. |
| 2015/0306922 A1 | 10/2015 | Kim et al. |
| 2019/0092103 A1* | 3/2019 | Giannini ............... B60C 19/002 |

* cited by examiner

DEVICES FOR REDUCING TIRE NOISE

CROSS-REFERENCE TO RELATED APPLICATION

This application claims priority to U.S. Provisional Patent Application No. 62/384,498, filed on Sep. 7, 2016, the disclosure of which is incorporated by reference herein in its entirety.

FIELD OF INVENTION

This disclosure relates to the reduction of noises generated by tires as they contact the road. More particularly, the disclosure relates to apparatuses inserted within tires to reduce such noise. Even more particularly, the disclosure describes noise dampers, noise attenuation devices, and tires including noise dampers or noise attenuation devices.

BACKGROUND

Known tire noise dampers, for example, are placed within the tire and permanently affixed to a tire innerliner. The dampers may include foam or fibers. The dampers reduce sound noise within the tire, and thus reduce noise emitted from the tire.

SUMMARY OF THE INVENTION

In one embodiment, a noise damper, configured for use within a passenger, light-truck, or truck-and-bus-radial tire, includes a foam that transitions from a compressed state foam to an expanded state foam upon introduction to a stimulus. The compressed state foam includes a primary axis having a compressed abscissa length (CAL), a secondary axis having a compressed ordinate height (COH), and a tertiary axis having a compressed applicate depth (CAD). The expanded state foam includes a primary axis having an expanded abscissa length (EAL), a secondary axis having an expanded ordinate height (EOH), and a tertiary axis having an expanded applicate depth (EAD). The EAL is configured to extend across 20-120% of a tire section width, the EOH is configured to extend across at least 20-120% of a tire section height, and the EAD is configured so that the expanded state foam contacts two points on an tire inner circumference. The foam has a sound absorption coefficient between 0.4 and 1.5.

In another embodiment, a noise attenuation device includes at least three distinct foam masses, including a first foam mass, a second foam mass, and a third foam mass, all of which expand in volume upon introduction to a stimulus to at least partially fill a tire cavity and an annular, extensible cord that connects the distinct foam masses. The first, second, and third foam masses have a first density before introduction to the stimulus, and the first, second, and third foam masses have a second density that is 70-96% of the first density after introduction to the stimulus.

In another embodiment, a tire and noise damper assembly comprises a tire that includes a first annular bead and a second annular bead, a body ply extending between the first annular bead and the second annular bead, an annular belt package, disposed radially upward of the body ply and extending axially across a portion of the body ply, a circumferential tread disposed radially upward of the annular belt package and extending axially across a portion of the body ply, and a first sidewall extending between the first annular bead and a first shoulder, the first shoulder being associated with the circumferential tread, and a second sidewall extending between the second annular bead and a second shoulder, the second shoulder being associated with the circumferential tread. The noise damper comprises a polymer that transitions from a compressed state to an expanded state upon introduction to a stimulus, wherein: the polymer has a first density before introduction to the stimulus, the polymer has a second density that is 70-96% of the first density after introduction to the stimulus, and the polymer has a sound absorption coefficient between 0.4 and 1.5.

BRIEF DESCRIPTION OF THE DRAWINGS

In the accompanying drawings, structures are illustrated that, together with the detailed description provided below, describe exemplary embodiments of the claimed invention. Like elements are identified with the same reference numerals. It should be understood that elements shown as a single component may be replaced with multiple components, and elements shown as multiple components may be replaced with a single component. The drawings are not to scale and the proportion of certain elements may be exaggerated for the purpose of illustration.

FIGS. 1c-1g are cross-sectional views of alternative embodiments of the noise damper shown in FIG. 1a;

FIGS. 2b-2d are cross-sectional side views of alternative embodiments of the noise damper and tire shown in FIG. 2a;

FIG. 3b is a cross-sectional side view of yet another alternative embodiment of the noise attenuation device and tire shown in FIG. 3a;

DETAILED DESCRIPTION

The following includes definitions of selected terms employed herein. The definitions include various examples and/or forms of components that fall within the scope of a term and that may be used for implementation. The examples are not intended to be limiting. Both singular and plural forms of terms may be within the definitions.

"Axial" and "axially" refer to a direction that is parallel to the axis of rotation of a tire.

"Circumferential" and "circumferentially" refer to a direction extending along the perimeter of the surface of the tread perpendicular to the axial direction.

"Radial" and "radially" refer to a direction perpendicular to the axis of rotation of a tire.

"Sidewall" as used herein, refers to that portion of the tire between the tread and the bead.

"Tread" as used herein, refers to that portion of the tire that comes into contact with the road or ground under normal inflation and normal load.

"Tread depth" refers to the distance between a top surface of the tread and the bottom of a major tread groove.

"Tread width" refers to the width of the ground contact area of a tread which contacts with the road surface during the rotation of the tire under normal inflation and load.

While similar terms used in the following descriptions describe common tire components, it is understood that because the terms carry slightly different connotations, one of ordinary skill in the art would not consider any one of the following terms to be purely interchangeable with another term used to describe a common tire component. Furthermore, to the extent the term "under" is used in the specification or claims, it is intended to mean not only "directly under" but also "indirectly under" where intermediary tire layers or components are disposed between two identified components or layers.

Directions are stated herein with reference to the axis of rotation of the tire. The terms "upward" and "upwardly" refer to a general direction towards the tread of the tire, whereas "downward" and "downwardly" refer to the general direction towards the axis of rotation of the tire. Thus, when relative directional terms such as "upper" and "lower" or "top" and "bottom" are used in connection with an element, the "upper" or "top" element is spaced closer to the tread than the "lower" or "bottom" element. Additionally, when relative directional terms such as "above" or "below" are used in connection with an element, an element that is "above" another element is closer to the tread than the other element.

The terms "inward" and "inwardly" refer to a general direction towards the equatorial plane of the tire, whereas "outward" and "outwardly" refer to a general direction away from the equatorial plane of the tire and towards the sidewall of the tire. Thus, when relative directional terms such as "inner" and "outer" are used in connection with an element, the "inner" element is spaced closer to the equatorial plane of the tire than the "outer" element.

Figure 1A:
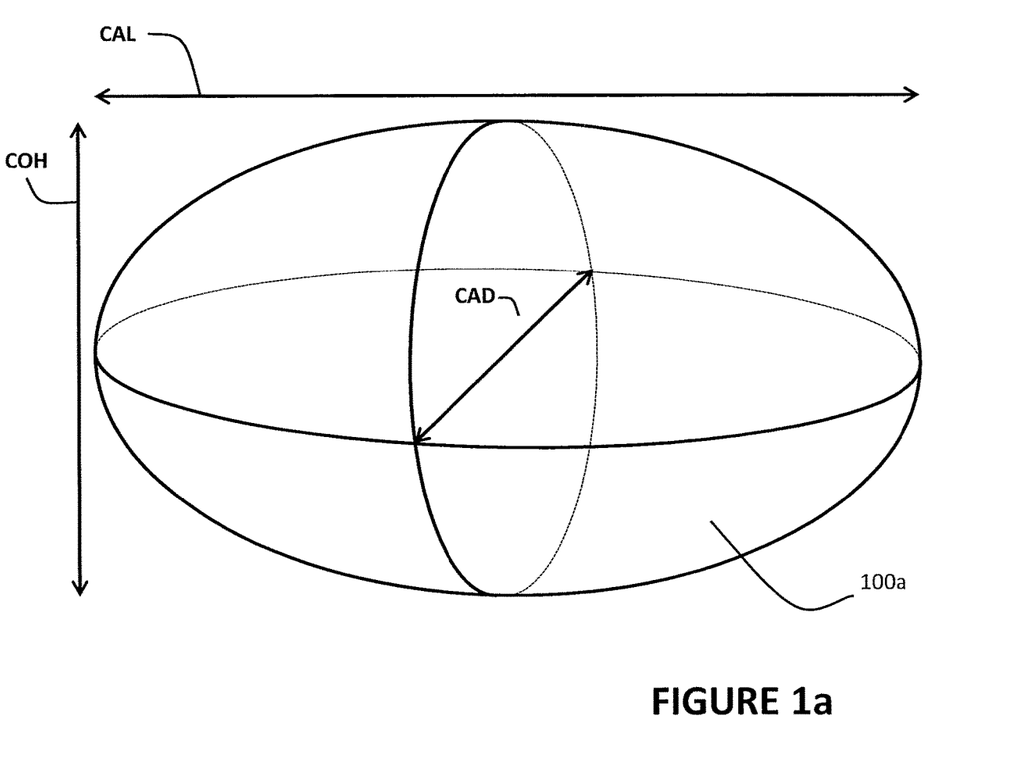
FIG. 1a is a perspective view of an embodiment of a noise damper configured for use within a tire.

FIG. 1a is a perspective view of an embodiment of a noise damper 100a configured for use within a passenger, light-truck, or truck-and-bus-radial tire. As shown in FIG. 1a, noise damper 100a is an ellipsoid in a compressed state. Noise damper 100a includes a primary axis having a compressed abscissa length (CAL), a secondary axis having a compressed ordinate height (COH), and a tertiary axis having a compressed applicate depth (CAD). In one embodiment, the compressed abscissa length (CAL) is 75-210 mm, the compressed ordinate height (COH) is 20-190 mm, and the compressed applicate depth (CAD) is 40-200 mm. In another embodiment, the compressed abscissa length (CAL) is 190-335 mm, the compressed ordinate height (COH) is 55-300 mm, and the compressed applicate depth (CAD) is 135-190 mm.

As shown in FIG. 1a, noise damper 100a has a circular cross section. Because noise damper 100a has a circular cross section, the compressed ordinate height (COH) equals the compressed applicate depth (CAD), however, these measurements do not need to be equal in alternative embodiments. In alternative embodiments (not shown), the noise damper may be provided in a variety of shapes. Suitable exemplary shapes include, without limitation, a capsule, cylinder, crescent, cube, disc, ovoid, prism, ring, or sphere.

Figure 1B:
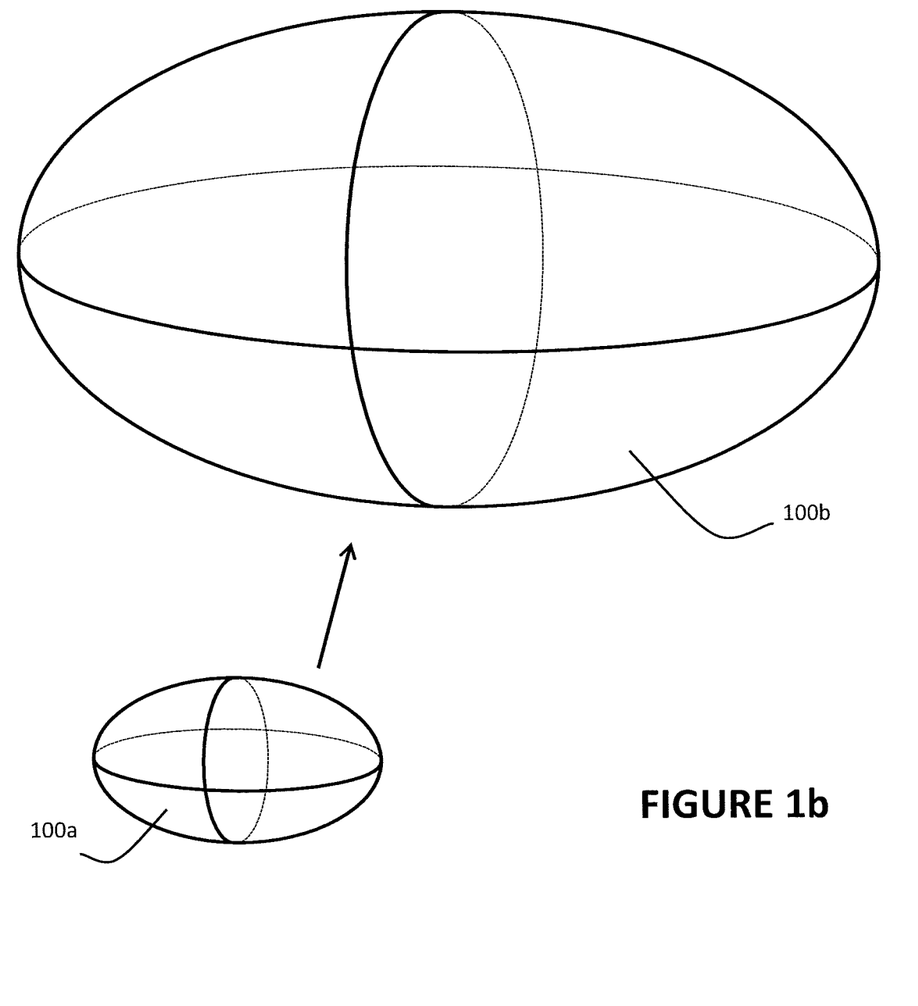
FIG. 1b is a perspective view of an embodiment of a noise damper configured for use within a tire.

FIG. 1b is a perspective view of an embodiment of a noise damper, configured for use within a tire, in a compressed and expanded state. Noise damper 100a is an ellipsoid in a compressed state, and noise damper 100b is an ellipsoid in an expanded state. The arrow (not labeled) depicts a transition from the compressed state to an expanded state. Noise dampers 100a and 100b are not necessarily drawn to scale (although the noise damper 100b in the expanded state is always larger than the noise damper 100a in the compressed state). In one embodiment, the volume of the noise damper expands 0.3-10× after transitioning from a compressed state to an expanded state. In another embodiment, the volume of the noise damper expands $3 \times 10^{-2}$-0.2× after transitioning from a compressed state to an expanded state.

FIGS. 1c-1g are cross-sectional views of alternative embodiments of the noise damper 100a shown in FIG. 1a.

Figure 1C:
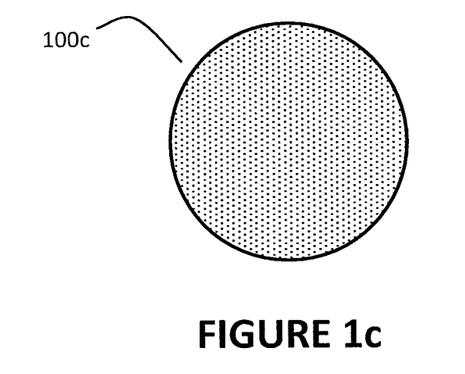

In particular, FIG. 1c shows an alternative embodiment of a noise damper 100c in a compressed state. Noise damper 100c is spherical and has a circular cross section.

Figure 1D:
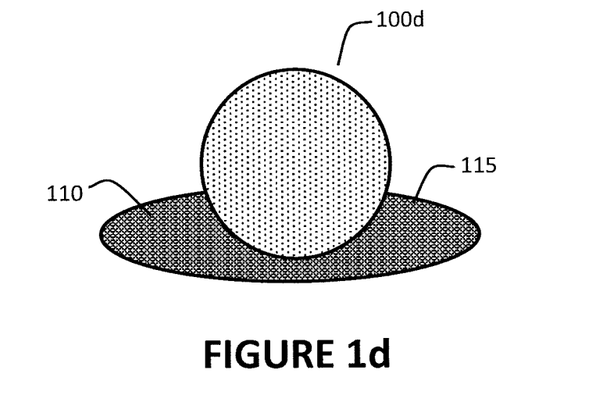

FIG. 1d shows another alternative embodiment of a noise damper 100d in a compressed state. In this embodiment, the noise damper 100d has a circular body 105, a first fin 110, and a second fin 115. In the embodiment shown in FIG. 1d, first fin 110 and second fin 115 are made of a different material than circular body 105. In an alternative embodiment (not shown), the fins and body are made of the same material.

Figure 1E:
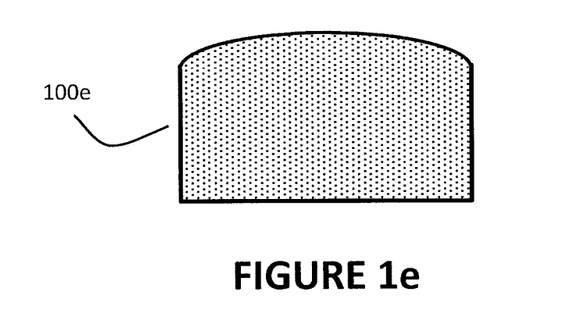

FIG. 1e shows yet another alternative embodiment of a noise damper 110e in a compressed state. In this embodiment, the noise damper 100e has a substantially rectangular cross section with rounded edges. Noise damper 110e's rounded edge may be configured to match a tire innerliner's curvature.

Figure 1F:
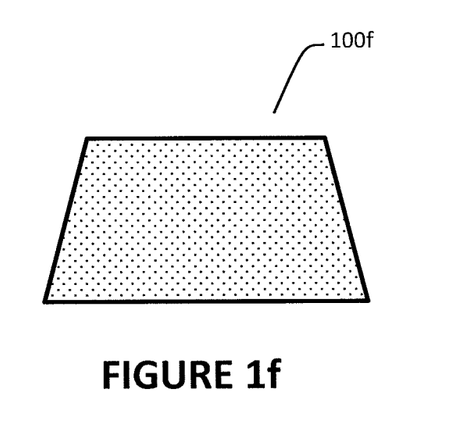

FIG. 1f shows still another alternative embodiment of a noise damper 110f in a compressed state. In this embodiment, the noise damper 100f has a substantially trapezoidal cross section. Either the top or bottom bases may be configured to match a tire innerliner's curvature.

Figure 1G:
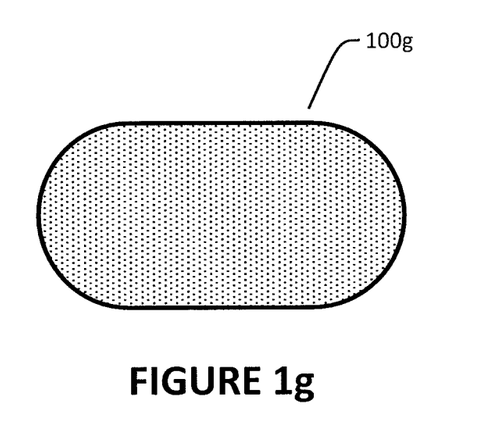

FIG. 1g shows yet another alternative embodiment of a noise damper 110g in a compressed state. In this embodiment, the noise damper 100g has a capsular cross section.

The exemplary embodiments shown in FIGS. 1a-1g are not meant to be limiting. As one of ordinary skill in the art will understand, and as shown in FIGS. 1a-1g, a wide variety of cross sections are suitable for the noise damper in a compressed state.

Figure 2A:
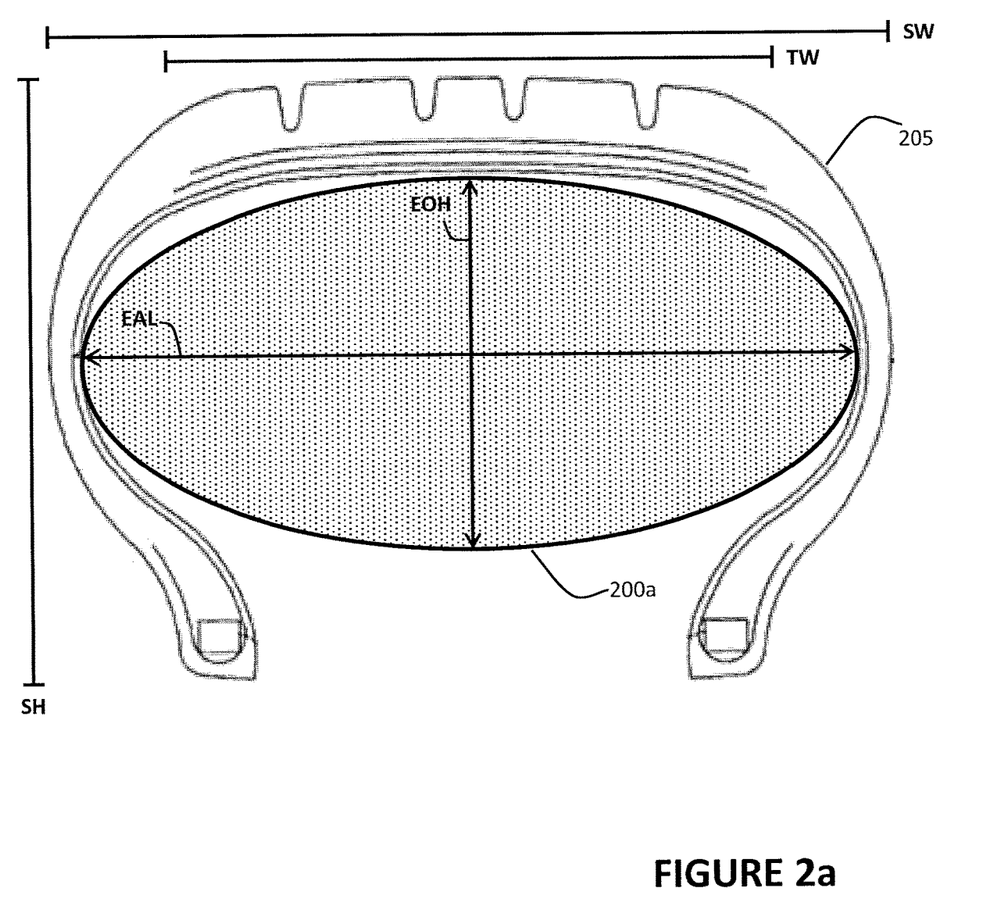
FIG. 2a is a cross-sectional view of a noise damper and a tire.

FIG. 2a is a cross-sectional view of a noise damper 200a and a tire 205. Noise damper 200a is a foam ellipsoid in an expanded state (after starting in a compressed state such as in one of the forms shown in FIGS. 1a-1g). Noise damper 200a is configured for use within a passenger, light-truck, or truck-and-bus-radial tire.

Figure 2B:
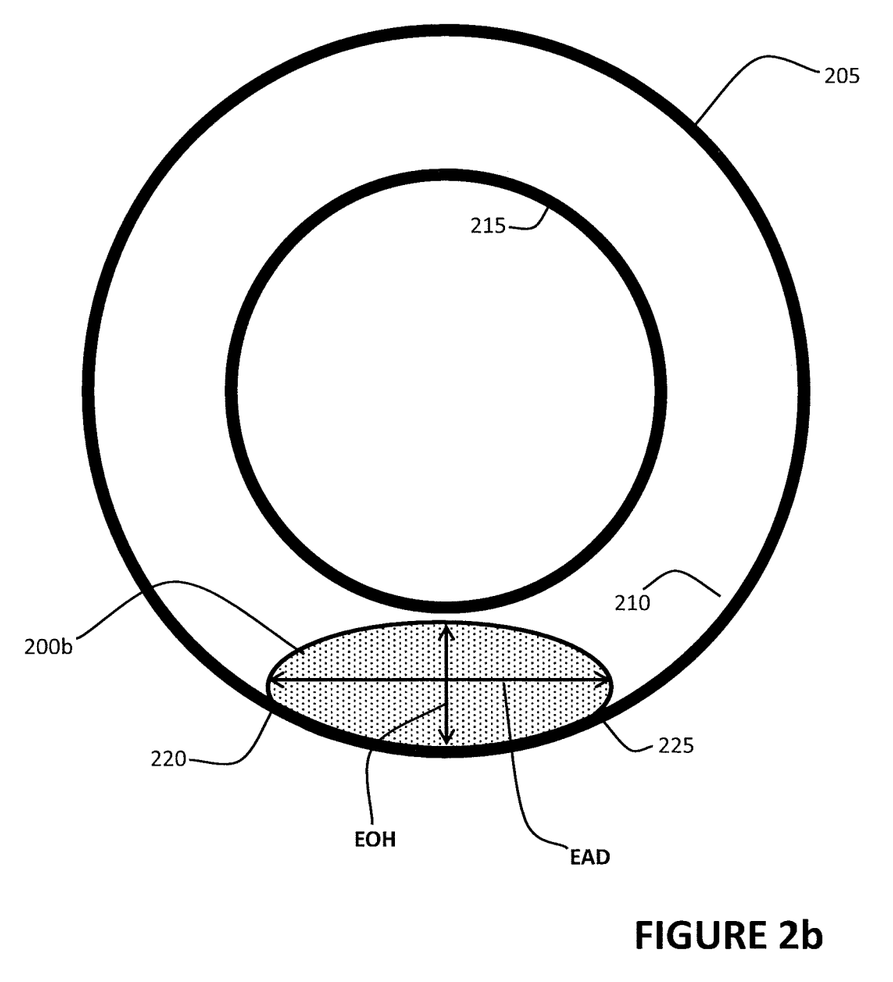

Noise damper 200a includes a primary axis having an expanded abscissa length (EAL), a secondary axis having an expanded ordinate height (EOH) (the tertiary axis having an expanded applicate depth (EAD) is shown in FIG. 2b). In one embodiment, the expanded abscissa length (EAL) is 85-220 mm, the expanded ordinate height (EOH) is 25-200 mm, and the expanded applicate depth (EAD) include 50-200 mm. In another embodiment, the expanded abscissa length (EAL) is 220-350 mm, the expanded ordinate height (EOH) is 65-315 mm, and the expanded applicate depth (EAD) include 150-400 mm. In alternative embodiments (not shown), the noise damper may be provided in a variety of shapes when it is in an expanded state. Suitable exemplary shapes include, without limitation, a capsule, cylinder, crescent, cube, disc, ovoid, prism, ring, or sphere. The noise damper may also be configured to compliment a tire cavity.

With continued reference to FIG. 2a, noise damper 200a is configured to extend across 20-120% of a tire section width (SW). Likewise, noise damper 200a is configured to extend across 20-120% of a tire section height (SH). When the noise damper exceeds the section width or section height, its movement within the tire cavity is hindered. In an alternative embodiment, the noise damper is configured to extend across 30-70% of a tire section width and across 30-70% of a tire section height. In another alternative embodiment, the noise damper is configured to extend across 50-90% of a tire section width and across 50-90% of a tire section height. In yet another alternative embodiment, the noise damper is configured to contact both a tire and wheel rim. Additionally, although not shown, the damper may further include pores, protrusions (e.g., without limitation, pyramidal protrusions), depressions, tunnels, or surface fibers.

Figure 2C:
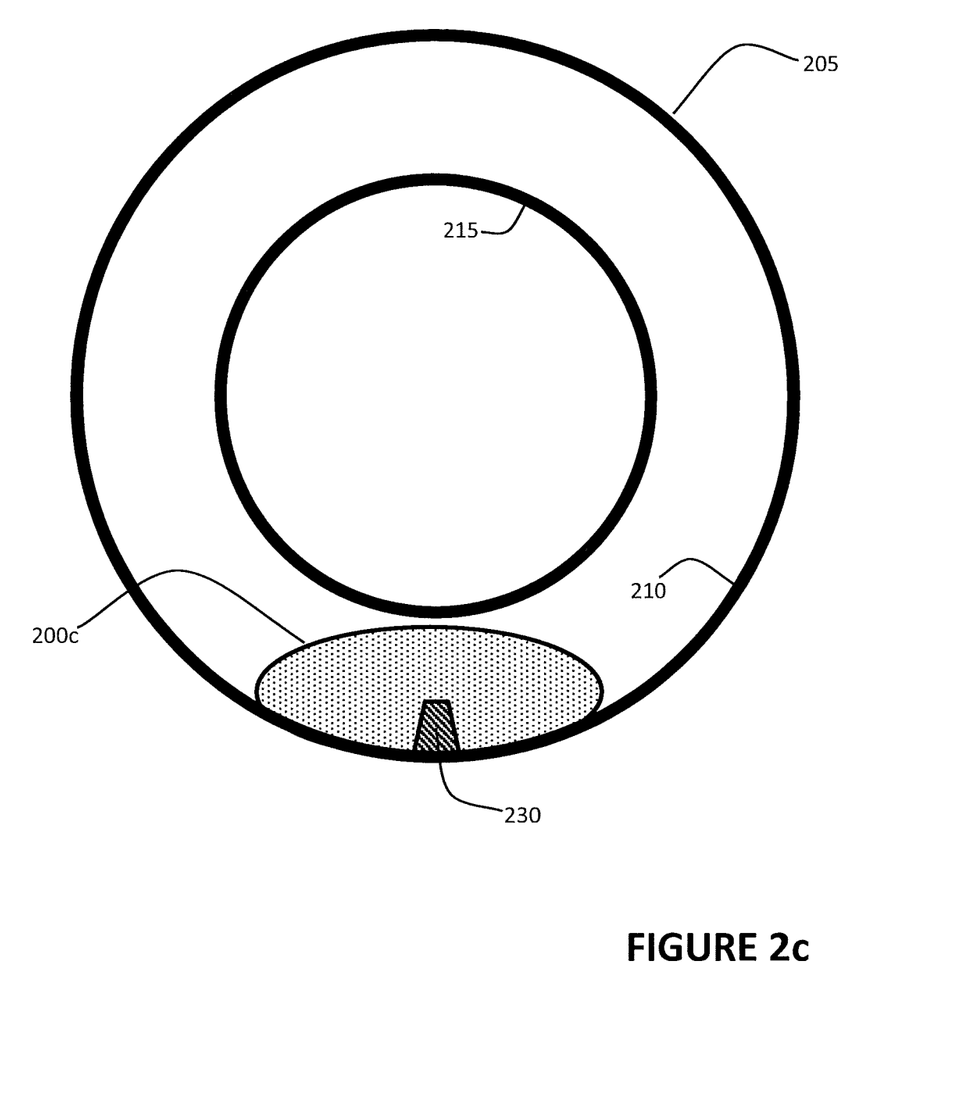
Figure 2D:
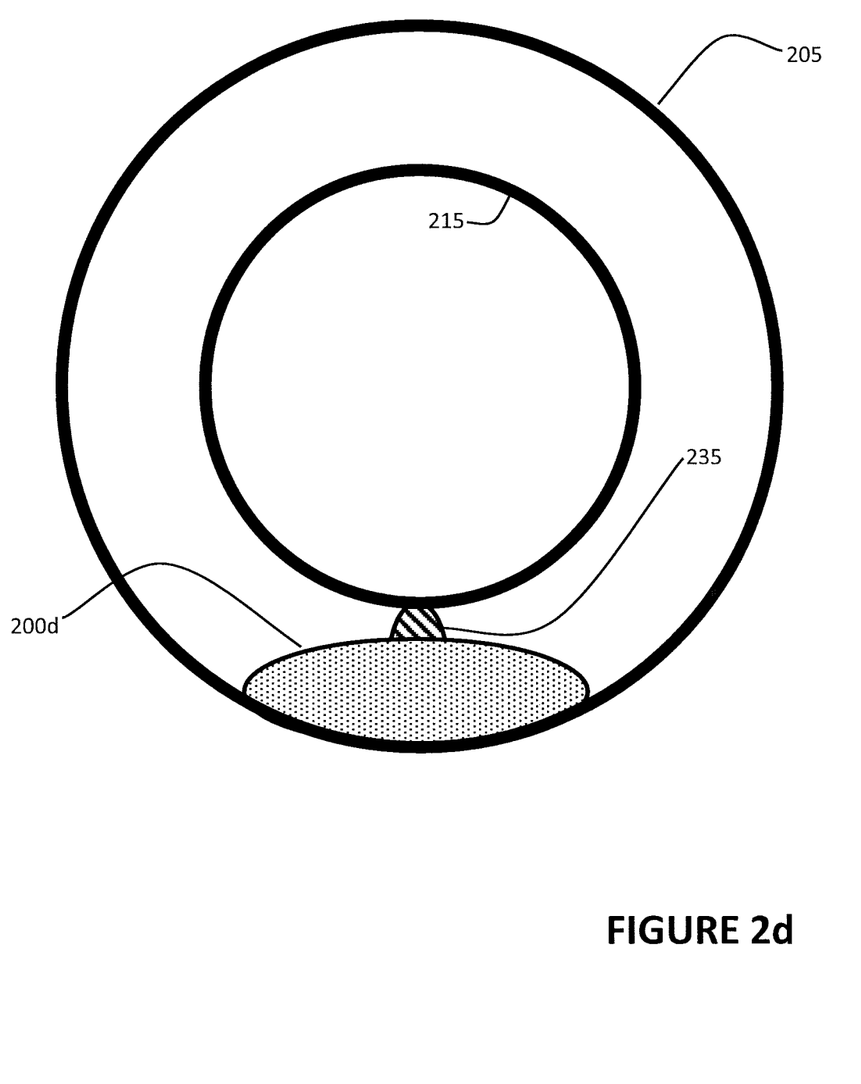

FIGS. 2b-2d are cross-sectional side views of alternative embodiments of the noise damper and tire shown in FIG. 2a. FIGS. 2b-2d depict dampers 200b-d, tire 205, innerliner 210, and wheel rim 215. Tire 205, innerliner 210, and wheel rim 215 are depicted for context. A counterweight (not shown) may also be included for balance purposes.

As shown in FIG. 2b, noise damper 200b includes a tertiary axis having an expanded applicate depth (EAD), a first contact point 220, and a second contact point 225. The EAD is configured so that noise damper 200b contacts at least two points on innerliner 210. As shown, noise damper 200b contacts many points on innerliner 210. In an alternative embodiment (not shown), the expanded state foam further includes tunnels. The tunnels may be straight or wavy.

FIG. 2c shows noise damper 200c that further includes a groove (not labeled) configured to receive a protrusion 230. Protrusion 230 extends from the tire and substantially compliments a groove in noise damper 200c. Thus, in the embodiment shown in FIG. 2c, tire 205 further comprises at least one means for hindering movement of the damper.

FIG. 2d shows noise damper 200d, which further includes a single fin 235. Fin 235 extends from damper 200d and contacts wheel rim 215. Fin 235 imparts a force upon wheel rim 215. Thus, damper 200d further comprises at least one means for hindering movement of the damper. In an alternative embodiment (not shown), the fin(s) contacts the tire innerliner (e.g., near the bead), which would also hinder movement of the damper.

Although not shown in the figures, the noise damper 100a-g and 200a-d may be made from a carrier (e.g., polyurethane, polyester, polyether, or melamine) and an absorber (e.g., hydrogels, polyacrylate salts, sodium polyacrylate, slush powders, and other superabsorbent copolymers). In an alternative embodiment, the noise damper further comprises ethylene glycol.

The foam of the noise damper transitions from a compressed state foam to an expanded state foam upon introduction to a stimulus. In one embodiment, the stimulus is hydrophilic. In another embodiment, moisture is the stimulus. In a particular embodiment, the foam transitions from a compressed state foam to an expanded state foam upon introduction to an atmospheric environment having a relative humidity of at least 20% (e.g., without limitation, the foam may be compressed in relatively arid atmospheric conditions and humidity in the air causes the foam to expand). In an alternative embodiment, the foam transitions from a compressed state foam to an expanded state foam upon introduction to an atmospheric environment having a relative humidity of at least 40%. In yet another alternative embodiment, foam in a compressed state is wrapped in a dissolvable material and the foam expands after the dissolvable material is removed.

In addition, although not shown, the foam in the noise damper may be configured to transition from a compressed state foam to an expanded state foam over 24-96 hours.

The foam has a sound absorption coefficient between 0.4 and 1.5. In an alternative embodiment, the foam has a sound absorption coefficient between 0.7 and 1.1.

Figure 3A:
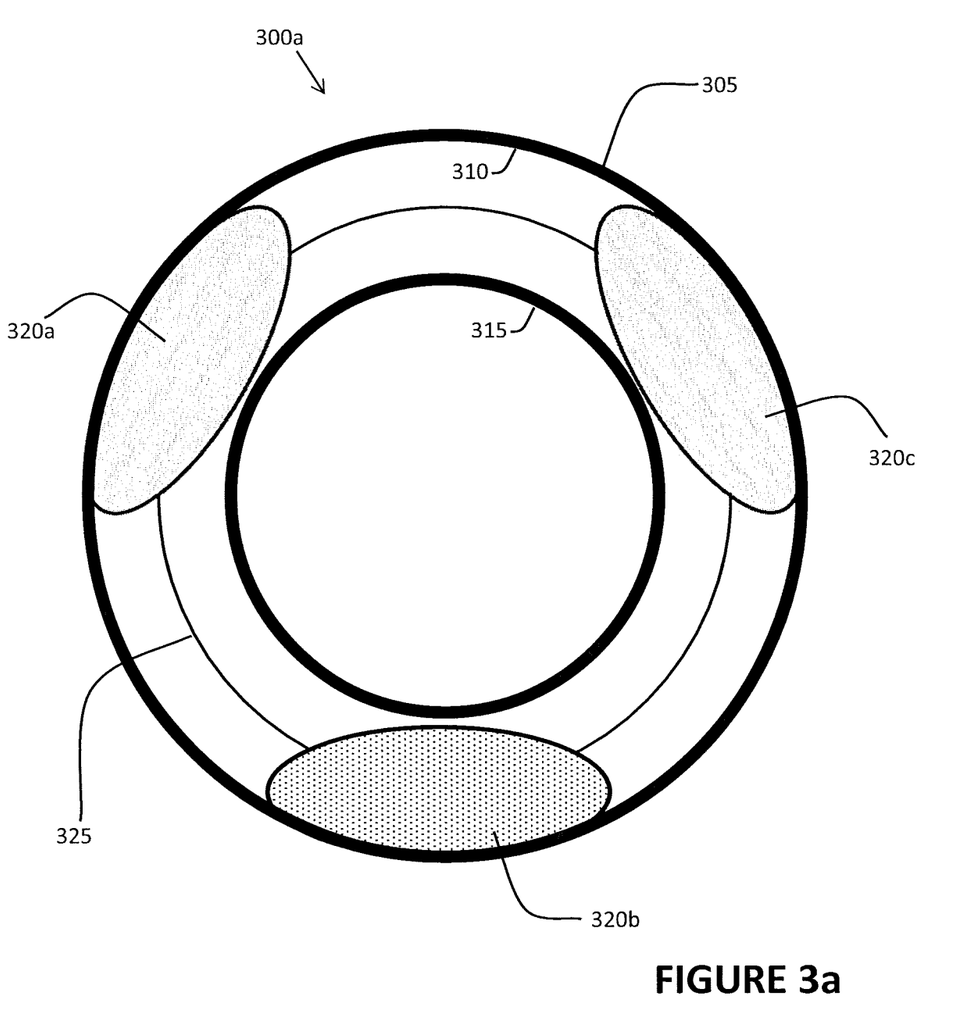
FIG. 3a is a cross-sectional side view of another alternative embodiment of a noise attenuation device and a tire.

FIG. 3a is a cross-sectional side view of a noise attenuation device 300a and a tire 305. Tire 305, innerliner 310, and wheel rim 315 are depicted for context.

As shown in FIG. 3a, noise attenuation device 300a includes a first foam mass 320a, a second foam mass 320b, and a third foam mass 320c. The foam masses expand in volume upon introduction to a stimulus to at least partially fill a tire cavity. Although foam masses 320a-c are shown as ellipsoids, one of ordinary skill in the art will appreciate that the foam masses are not limited to this configuration.

Noise attenuation device 300a further includes a cord 325 that connects the distinct foam masses. In the embodiment shown, the cord is annular and extensible. In an alternative embodiment (not shown), the cord is inextensible (e.g., like a hoop).

To situate noise attenuation device 300a, the device may be placed within tire 305. Alternatively, the device may be placed over wheel rim 315. A stimulus is then introduced to the foam masses, which causes the foam masses to expand within the tire cavity.

Figure 3B:
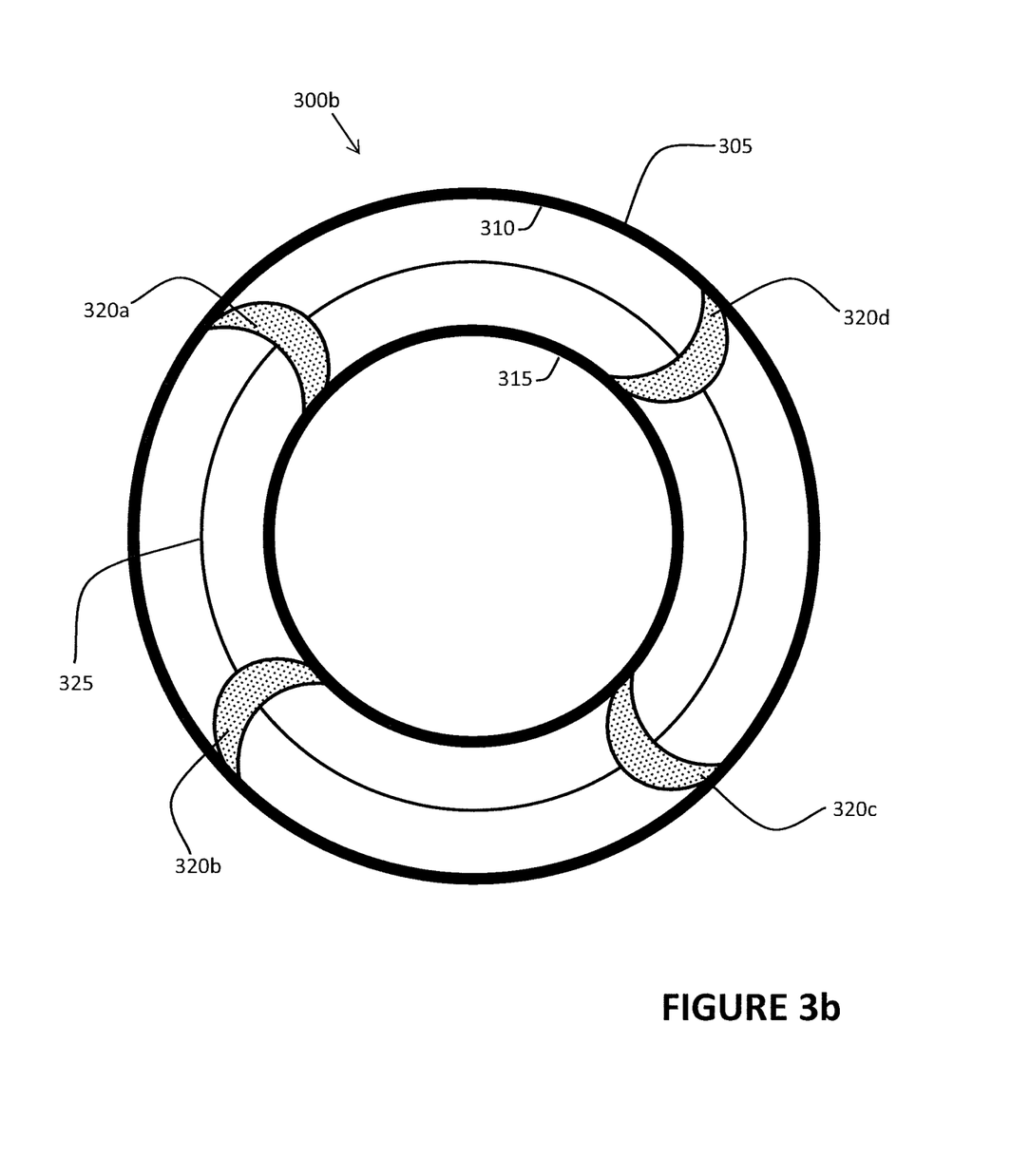

FIG. 3b is a cross-sectional side view of an alternative embodiment of the noise attenuation device 300b and tire 305. As shown in FIG. 3b, noise attenuation device 300b includes a first foam mass 320a, a second foam mass 320b, a third foam mass 320c, and a fourth foam mass 320d. Although foam masses 320a-d are shown as arched discs, one of ordinary skill in the art will appreciate that the foam masses are not limited to this configuration.

Although not shown in the figures, the foam masses 320a-d are substantially similar to the noise damper discussed with relation to FIGS. 1a-f and 2a-d. Like the noise damper, the foam masses expand in volume upon introduction to a stimulus. By way of example, before introduction to the stimulus, the masses have a cross section of X, and after introduction to the stimulus, the masses may have a cross section of 1.04-1.2 X. Similarly, before introduction to the stimulus, the masses have a first density, and after introduction to the stimulus the masses have a second density that is 70-96% of the first density.

Figure 4:
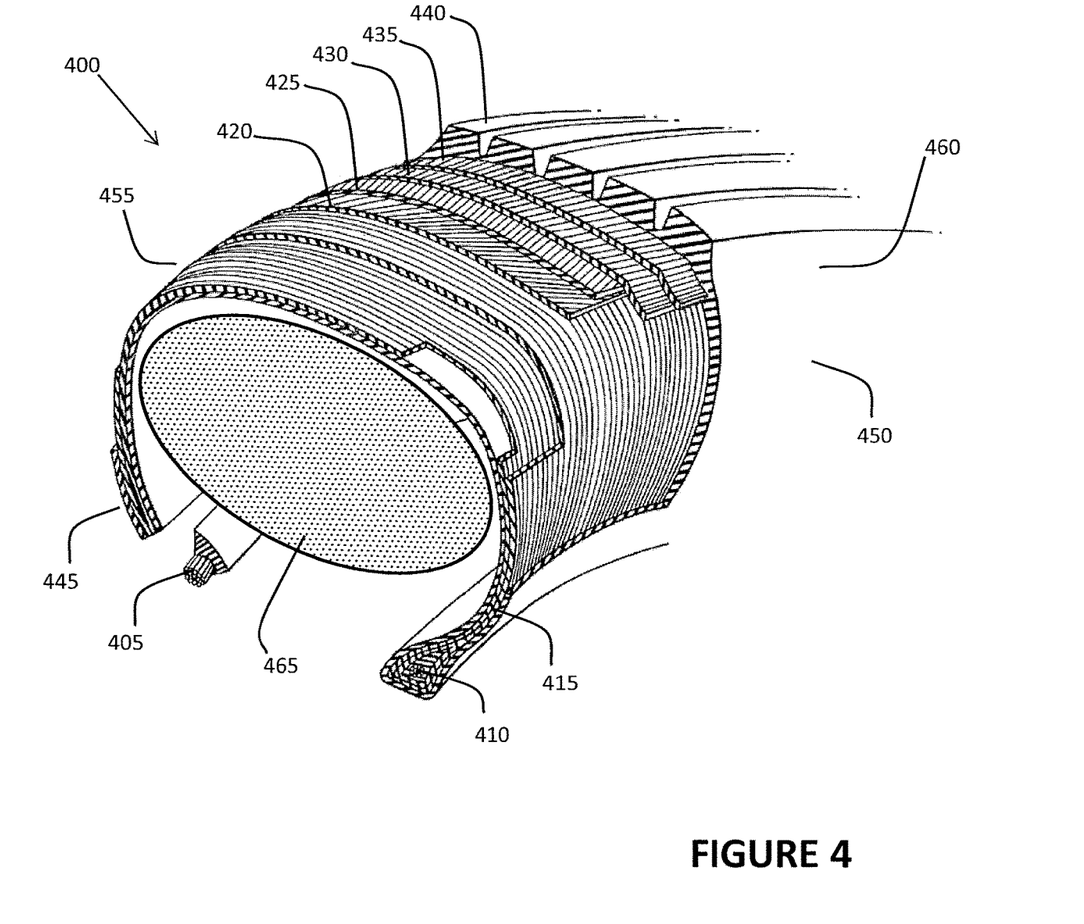
FIG. 4 is a peel-away cross-sectional perspective view of an embodiment of a tire and noise damper assembly.

FIG. 4 is a peel-away cross-sectional perspective view of an embodiment of a tire 400. As shown, tire 400 features a first annular bead 405 and a second annular bead 410. The annular beads, in part, secure the tire to a wheel. In an alternative embodiment (not shown), the tire comprises four or more beads.

As shown, tire 400 further features a body ply 415 extending between first annular bead 405 and second annular bead 410. Body ply 415 forms an annulus and imparts shape to the tire. As one of ordinary skill in the art will understand, body ply 415 may contain reinforcing cords or fabric (not shown). In alternative embodiments (not shown), various turn-up and turn-down configurations, or multiple body plies, are used.

Tire 400 further comprises a first circumferential belt 420 and a second circumferential belt 425. First circumferential belt 420 is disposed radially upward of body ply 415 and extends axially across a portion of body ply 415. Second circumferential belt 425 is disposed radially upward of first circumferential belt 420 and extends axially across a portion of body ply 415. The circumferential belts reinforce the tire and increase its stiffness. As one of ordinary skill in the art will understand, the circumferential belts may contain steel cords and reinforcing cords (both not shown). In an alternative embodiment (not shown), the tire contains a third and/or fourth circumferential belt.

Tire 400 further includes cap plies 430 and 435. First cap ply 430 is disposed radially upward of circumferential belts 420 and 425 and extends axially across a portion of body ply 415. Second cap ply 435 is disposed radially upward of first cap ply 430 and extends axially across a portion of body ply 415. The cap plies restrict tire expansion when the tire rotates. In an alternative embodiment (not shown), the plies are omitted.

Tire 400 further comprises a circumferential tread 440. Circumferential tread 440 is disposed radially upward of circumferential belts 420 and 425 extends axially across a portion of body ply 415. Circumferential grooves (not labeled) divide circumferential tread 440 into ribs. As one of ordinary skill in the art will understand, circumferential tread 440 is affixed to tire 400 when tire 400 is new. In an alternative embodiment (not shown), the circumferential tread is affixed as a retread.

Tire 400 further comprises a first sidewall 445 and a second sidewall 450. First sidewall 445 extends between the first annular bead 405 and a first shoulder 455, which is proximately associated with an edge of circumferential tread 440. Second sidewall 450 extends between the second annular bead 410 and a second shoulder 460, which is proximately associated with an opposite edge of circumferential tread 440. In an alternative embodiment (not shown), the sidewall is proximately associated with an undertread (not shown).

Tire 400 further comprises a noise damper 465. Noise damper 465 fits inside the tire cavity (not labeled) and reduces noise within the tire cavity. In one embodiment, the noise damper 100 described above constitutes the noise damper assembly. In another embodiment, the noise attenuation device 300 described above constitutes the noise damper assembly. In yet another embodiment, at least one foam mass 320 constitutes the noise damper assembly.

Although not shown in the figures, the noise damper 465 is substantially similar to the noise damper and foam masses discussed with relation to FIGS. 1a-f, 2a-d, and 3a-b.

In a particular embodiment, noise damper 465 is made of a polymer that transitions from a compressed state to an expanded state upon introduction to a stimulus. Exemplary polymers include polyacrylate salts, sodium polyacrylate, slush powders, and other superabsorbent copolymers or hydrogels. Further, the polymer has a sound absorption coefficient between 0.4 and 1.5. In an alternative embodiment, the polymer has a sound absorption coefficient between 0.7 and 1.1. In another alternative embodiment, the noise damper further includes a second polymer that transitions from a compressed state to an expanded state upon introduction to a stimulus.

What is claimed is:

1. A noise damper, configured for use within a passenger, light-truck, or truck-and-bus-radial tire, comprising:
   a foam that transitions from a compressed state foam to an expanded state foam upon introduction to an atmospheric environment having a relative humidity of at least 20%, wherein
   the compressed state foam includes a primary axis having a compressed abscissa length (CAL), a secondary axis having a compressed ordinate height (COH), and a tertiary axis having a compressed applicate depth (CAD);
   the expanded state foam includes a primary axis having an expanded abscissa length (EAL), a secondary axis having an expanded ordinate height (EOH), and a tertiary axis having an expanded applicate depth (EAD), wherein
   the EAL is configured to extend across 20-120% of a tire section width,
   the EOH is configured to extend across at least 20-120% of a tire section height, and
   the EAD is configured so that the expanded state foam contacts two points on an tire inner circumference; and
   the foam has a sound absorption coefficient between 0.4 and 1.5.

2. The noise damper of claim 1, wherein the damper is made of a foam material selected from the group consisting of polyurethane, polyester, polyether, and melamine.

3. The noise damper of claim 1, wherein the damper transitions from a compressed state foam to an expanded state foam in 24-96 hours after introduction to the atmospheric environment having the relative humidity of at least 20%.

4. The noise damper of claim 1, wherein the noise damper further comprises ethylene glycol.

5. The noise damper of claim 1, wherein the expanded state foam further includes tunnels.

6. The noise damper of claim 1, wherein the extended abscissa length is between 220 and 350 mm.

7. A noise attenuation device comprising:
   at least three distinct foam masses, including a first foam mass, a second foam mass, and a third foam mass, all of which expand in volume upon introduction to an atmospheric environment having a relative humidity of at least 20%, to at least partially fill a tire cavity; and
   an annular, extensible cord that connects the distinct foam masses, wherein
   the first, second, and third foam masses have a first density before introduction to the atmospheric environment having a relative humidity of at least 20%, and
   the first, second, and third foam masses have a second density that is 70-96% of the first density after introduction to the atmospheric environment having a relative humidity of at least 20%.

8. The noise attenuation device of claim 7, wherein the noise attenuation device further comprises a fourth foam mass that expands in volume upon introduction to a stimulus the atmospheric environment having a relative humidity of at least 20%, to at least partially fill a tire cavity.

9. The noise attenuation device of claim 7, wherein at least one of the three distinct foam masses has an elliptical cross section.

10. The noise attenuation device of claim 7, wherein at least one of the three distinct foam masses has a trapezoidal cross section.

11. The noise attenuation device of claim 7, wherein at least one of the three distinct foam masses is configured to contact both a tire and wheel rim.

12. The noise damper of claim 1, wherein the expanded state foam has an elliptical cross section.

13. The noise damper of claim 1, wherein the expanded state foam has a trapezoidal cross section.

* * * * *